United States Patent Office 3,014,818
Patented Dec. 26, 1961

3,014,818
ELECTRICALLY CONDUCTING ARTICLES AND PROCESS OF MAKING SAME
Tod Wildy Campbell, Wilmington, Del., assignor to E. I. du Pont de Nemours and Company, Wilmington, Del., a corporation of Delaware
No Drawing. Filed Dec. 9, 1957, Ser. No. 701,326
26 Claims. (Cl. 117—227)

This invention relates to textile fibers and films of synthetic polymers and particularly to fibers and films containing a substantial amount of reduced free metal particles.

The desirability of making electrically conducting shaped articles from polymers has long been recognized. It is proposed in U.S. Patent 2,748,099 to mix metals with polymers and mold the mixture, but such high levels of the metal have been required to afford electrical conductivity that the physical properties of the molded object are significantly lower than that of the pure polymer. When metals have been co-spun with fiber-forming polymers, the resulting fibers have not conducted electricity.

It is an object of this invention to provide new and useful shaped polymeric articles containing high concentrations of free metal particles having good physical properties.

Another object of this invention is to provide new and useful shaped articles having dispersed therein high concentrations of free metal particles and also having a metal plating on the surface of the article.

A further object of this invention is to provide new and useful shaped articles as set forth above which are electrically conductive.

The following is a flow diagram illustrating an embodiment of the claimed invention:

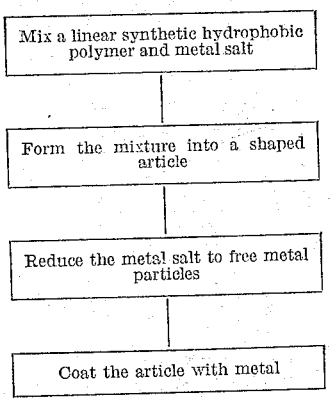

In accordance with this invention there is provided an electrically conductive shaped article comprising a polymeric material containing dispersed therein finely divided particles of a heavy metal which is more electronegative than chromium in the electromotive force series, said particles having an average diameter of less than about one micron and being present in an amount between about 0.1% and about 35% based upon the total weight of the article; said article containing 0% to about 6% by weight inclusive of a thin adherent coating of a metal, preferably nickel, cobalt, copper, or the like. Preferably, the shaped articles of this invention are films or fibers prepared from synthetic organic polymeric materials which are capable of being formed into textile fibers.

The term "shaped article" as used herein refers to fibers, fabrics, films, and fibrous particles such as "fibrids" which are synthetic organic polymer analogs of beaten cellulose. Preparation of the latter is illustrated in the examples.

In one embodiment of this invention there is provided an electrically conductive shaped article comprising a polymeric material containing dispersed throughout a free metal having an atomic number from 26 to 29, inclusive, for example, nickel, cobalt, copper, and iron, in the form of fine particles in an amount from about 4% to about 35% based upon the total weight of the article, the particles having an average diameter of less than about one micron and preferably less than 0.2 micron. Mixtures of these metals are also suitable.

Such an article, even without a plating, is electrically conductive as herein defined; that is, the article has a resistivity of less than 50,000 ohms per square as measured at 6 volts between two parallel ¾-inch brass bars placed ¾ inch apart on the surface of the article. The electrical conductivity of single filaments, yarns, or other strand materials is measured by placing a plurality of such strands in the form of a warp sheet one strand thick with all of the strands lying parallel to each other and in the same plane with each strand contacting the adjacent strands along their lengths and measuring the conductivity as indicated above. Preferably, such unplated metal impregnated shaped articles will contain between about 5% and about 25% free metal based upon the total weight of the structure, and even more desirably between about 5% and about 15% free metal by weight. Nickel and cobalt are particularly preferred as the metals in such articles because of the ease of preparation and the increased conductivity of such articles containing nickel or cobalt on a weight percent basis.

The unplated articles of this invention are conveniently prepared by admixing a suitable polymeric material with a reducible salt of nickel, cobalt, copper, or iron, forming the admixture into a shaped article, if it is not already in such form, for example, by extrusion through a conventional textile-spinning orifice, casting into a film, or the like, and then reducing the heavy metal salt to the free metal state. According to a preferred procedure, a film- or fiber-forming synthetic organic hydrophobic polymer in the form of a solution is admixed with such a suitable salt and formed into a fiber or film as desired, and then treated to reduce the salt to the free metal. In the case of a polymeric material such as cotton which need not be extruded since it already exists in the fibrous state, an electrically conductive fibrous material can be obtained by soaking the cotton in a bath of a suitable salt of one of the four metals mentioned above, or the cotton fiber may be otherwise impregnated to disperse the salt as uniformly as possible therethrough and the thus treated material subjected to a reducing treatment, whereby the metallic salt is converted to free metal particles, and plated. It is important that the free metal particles dispersed throughout the polymeric material, whether it be in the form of a film or fiber or whether synthetic or natural, have a particle size with an average diameter of less than one micron. It is also important that the free metal in the product be dispersed throughout the interior of the polymeric material rather than as a coating on the surface.

In accordance with another embodiment of this invention there is provided an electrically conductive shaped article comprising a polymeric material containing dispersed therein finely divided particles of a heavy metal which is more electronegative than chromium in the electromotive force series and also having a surface coating of nickel, cobalt, copper, etc. In such articles it is important that the free metal content in the form of dispersed particles throughout the interior of the article amount to between about 0.1% and about 35% based upon the total weight of the article and that the free metal particles have an average diameter of less than about one micron. Exemplary metals which in the form of fine particles may be dispersed through the article include nickel, cobalt, silver, lead, iron, tin, copper, palladium, platinum, gold, bismuth, antimony, and cadmium. Nickel, copper, and silver are preferred because of ease of processing, ease of controling results, in addition to economy. The coating on such articles comprises any plating metal (more electronegative than manganese) in the amount of between about 1% and about 60% based upon the total weight of the article. A coating weight in the amount of 5–10% on this basis provides excellent conductivity.

This thin adherent coating is preferably applied by chemically plating the desired metal or an alloy of the metal upon a preshaped article containing the necessary free metal particles dispersed therein.

A very satisfactory way of plating the shaped articles (Berzins, S.N. 634,142, filed January 15, 1957, now abandoned) is by using a plating solution consisting essentially of an aqueous alkaline solution of a nickel or cobalt salt, a borohydride, and an agent which by forming a complex with nickel or cobalt will maintain these metals in solution. Suitable complexing or sequestering agents include ammonia and organic complex-forming agents containing one or more of the following functional groups: primary, secondary, or tertiary amino groups; imino (=NH); carboxy groups and hydroxy groups. Such a bath requires a base of a metal to plate upon, such as nickel, cobalt, iron, platinum, palladium, copper manganese, chromium, tin, or silver, etc. The above plating baths give adherent, coherent deposits of nickel boron or cobalt boron alloys. They may be used at convenient temperatures, preferably as high as close to the boiling point as convenient, and preferably above 90° C. Plating with copper is very satisfactory. The use of an amine borane and an aqueous solution of nickel or cobalt ions permits plating at a pH of 3.5 or above.

Other satisfactory plating baths will be obvious to those skilled in the art as the use of a nickel salt-sodium hypophosphite bath to give a nickel-phosphorous alloy as shown in U.S. Patent 2,658,841.

The shaped articles of this invention can be plated before they are formed into papers or fabrics. A preferred modification, however, is to plate the fabrics or papers themselves with a metal. Such plating with nickel first confers a black color to the object which then turns to grey as the coating is increased and then to a lighter grey. Fabrics of this invention containing from 30 to 60% of a metal such as nickel are very satisfactory for use as filter screens, etc. Such fabrics can be satisfactorily used as they are or the polymeric matrix can be burnt away or dissolved to give a self-coherent metallic replica of the original fabric.

The plated articles of this invention are quite superior to known metal-coated polymeric materials in being electrically conducting and more particularly because of the very great bond strength of the plating or coating to the polymer structure. This exceptional strength is believed to be in part due to the presence of dispersed metallic particles throughout the interior.

Polymers satisfactory for use in this invention include linear synthetic organic hydrophobic polymers generally. Fiber-forming polymers are preferred, especially such polymers made from relatively low molecular weight monomers by condensation or addition polymerization methods.

Condensation polymers such as polyesters, polyamides, or polyester amides as described in U.S. Patents 2,071,250; 2,071,253; 2,130,523; 2,130,948; 2,190,770; 2,465,319, as well as the polyurethanes described in 2,731,446 and polyureas are satisfactory. Addition type polymers as polyhydrocarbons, polyethers, and those made from ethylenically unsaturated monomers as acrylonitrile, vinyl chloride, vinylidene chloride, vinyl acetate and their copolymers with each other and other similar monomers may be used; also cellulose acetate, rayon, etc.

Reduction of metal salts in the process of this invention may be attained with sodium borohydride ($NaBH_4$) or any other satisfactory reducing agents, for example, hydrazine, hypophosphorous acid, hydroxylamine and chromous chloride. In general, the reducing treatment including reducing agent, temperature, pH of the media, etc., should be selected so as to cause the least amount of degradation of the polymer as possible.

The expression "intrinsic viscosity" with the symbol $(n)$ as used herein signifies the value of $\ln (n)_r$ at the ordinate axis intercept (i.e., when $c$ equals 0) in a graph of $$\frac{\ln (n)_r}{c}$$

as ordinate with $c$ values (grams per 100 ml. of solution) as abscissas. The symbol $(n)_r$ refers to relative viscosity, which is the ratio of the flow times in a viscosimeter of a polymer solution and the solvent. The symbol $\ln$ is the logarithm to the base $e$. All measurements on polymers containing acrylonitrile are made with dimethylformamide solutions at 25° C.

The following examples illustrate the invention. All parts and percentages are by weight unless otherwise indicated. Also, all electrically conductive products perpared contain dispersed therein between about 4% and about 35% of free metal in the form of particles with average diameter less than one micron and all plated articles contain between 1% and about 60% of free metal in the coating based as the total weight of the article.

EXAMPLE I

A copolymer of acrylonitrile, methyl acrylate, and sodium styrene sulfonate having the percent composition 93.65/5.98/0.37 (intrinsic viscosity of 1.5) in an amount of 18 grams is mixed with 9 grams of anhydrous ferric chloride and 50 ml. of dimethylformamide. A clear viscous solution, made by heating this mixture to 70 to 100° C., is extruded at 120° C. through a spinneret containing 5 orifices of 0.005 inch in diameter into a spinning cell containing air at 180° C. and the resulting yarn is wound at 173 yards per minute.

The undrawn yarn is drawn 4× (four times its original length) over a 100° C. pin and the drawn yarn knitted into tubing of 48 loops per inch. The tubing is placed in a solution of 5 grams of sodium borohydride in 250 ml. of dimethylformamide and 75 ml. of water to reduce the iron. The resulting black fabric is washed thoroughly and dried. It contains 4–6% metallic iron, has a resistivity of about 20,000 ohms per square and is attracted toward a magnet. The metallic iron is present as particles of about 0.005 micron with none larger than 0.01 micron.

Another portion of the above solution is wet spun into a solution of 10 grams of sodium borohydride in 1,000 ml. of water from a hypodermic syringe with a needle having an inside diameter of 0.023 inch. The coagulated filament is black from the reduced iron and, after drying, is electrically conductive and attracted toward a magnet.

By substituting cobalt chloride for the ferric chloride and preparing a solution as before, a film having a resistivity of 25 ohms/square is obtained by casting the solution onto a glass plate, using a doctor's knife having a clearance of 5 mils. Analysis shows that the film contains dispersed therein about 8% cobalt after reduction of the cobalt ions to the free metal by treatment with sodium borohydride solution as above.

EXAMPLE II

The acrylonitrile polymer of Example I in an amount of 33 grams and 20 grams of lead chloride are dissolved in 150 ml. of dimethylsulfoxide at 40° C. The resulting solution is wet spun from a hypodermic needle as in the previous example into a solution of 10 grams of sodium borohydride in dimethylsulfoxide/water (750/750 ml.). The extruded fiber has a shiny, black appearance due to the presence of fine particles of metallic lead in the amount of 20% uniformly dispersed throughout the filament. The fiber is non-conducting, as defined previously, although the average diameter of the lead particles is less than 0.2 micron. When plated under the conditions of Example VI to give a nickel-coated article in which the coating amounts to 6% based on the total weight of the article, the article is electrically conductive.

EXAMPLE III

A. A solution of 100 grams of the acrylonitrile polymer of Example I and 55 grams of anhydrous nickel chloride in 275 ml. of dimethylformamide is clarified by heating to 80° C. Using the dry spinning conditions of Example I, the solution spins very well, and a pale green yarn is obtained. X-ray diagrams of the fibers show no crystals of nickel chloride which shows that either (1) the nickel chloride is dissolved in the solid polymer and completely dispersed or (2) the nickel chloride is present as solid particles less than 20 A. in size. The yarn is drawn 4× on a 100° C. pin to give a yarn containing about 30% nickel chloride having a tenacity of 2.8 g.p.d. and an elongation at the break of 33%. A typical tenacity for fibers made in the same way but containing no salts is 2.0 g.p.d.

A sample of the yarn (120 denier, 30 filament) is knitted into tubing of 48 loops per inch. A portion of the tubing weighing 11 grams is placed in a solution of 5 grams of sodium borohydride in 500 ml. of water. The fabric turns black due to the reduction of the nickel and some black material sloughs off into the reducing bath. After 5 minutes, the fabric is removed from the bath and washed thoroughly in soap and water. After drying, the fabric weighs 7.5 grams and contains 7.3% by weight nickel. Resistivity of the fabric is 100 ohms per square. The nickel is present as particles of between 0.005 micron and 0.010 micron in diameter as determined from X-ray analysis.

Another portion of as-spun yarn prepared as above is drawn 6× over a 100° C. pin. A skein of the drawn yarn is then placed in the sodium borohydride solution for two or three minutes to reduce the nickel and washed. This yarn (30 filaments of 2-denier per filament) has a resistance of 3,000 to 5,000 ohms per centimeter of length and contains about 6% metallic nickel. A filament of polyacrylonitrile prepared under similar conditions but free of metal has a resistance greater than $5 \times 10^9$ ohms per centimeter of length.

B. For comparison with the above product, a mixture of 25 grams of the same polymer, 100 ml. of dimethylformamide and 40 grams of nickel powder, smaller than 200 mesh (standard screen) powdered nickel and low in cobalt, is heated to produce a dispersion of the free metal in the polymer solution. Microscopic examination of the nickel powder shows it consists of particles ranging from $3\mu$ to $100\mu$ in size with the majority being 40 to $50\mu$ in diameter. A film is cast on a glass plate using a doctor blade with a clearance of 0.01 inch and is dried at 100° C. in a forced draft oven for 30 minutes. The dried film (0.002 inch thick) has a resistivity of greater than $10^9$ ohms per square. In view of the relatively high content of metallic nickel (61.5%) it is very surprising that this product is non-conductive as compared to the product containing much lower amounts of nickel reduced in situ.

C. Results similar to those in Example III-A are obtained using a solution of 21 grams of polyacrylonitrile having an inherent viscosity of 1.5 and 15 grams of anhydrous nickel chloride in 125 ml. of dimethylformamide.

EXAMPLE IV

A. A solution of 18 grams of the polymer of Example I and 9 grams of anhydrous cupric chloride in 50 ml. of dimethylformamide is cast into a film containing 10–20% residual solvent using a doctor blade with a clearance of 0.01 inch.

The film is treated for 5 minutes at 25° C. with a solution of 5 grams of sodium borohydride in one liter of 50% aqueous dimethylformamide to reduce the cupric salt to metallic copper. The treated film has metallic copper finely dispersed throughout the film. The film (0.002 inch thick) contains about 11% copper and has a resistivity of about 2,000–5,000 ohms per square.

Similar results are obtained using dimethylsulfoxide as the solvent, dry spinning the solution into filaments containing 10–35% residual solvent and drawing the filaments 8× in steam before reduction. The as-spun yarn is reduced to an electrically conductive product containing 14% copper.

B. A mixture of 50 grams of the same polymer as above (50 grams), 200 ml. of dimethylformamide and 25 grams of electrolytic copper dust (smaller than 200 mesh) is heated to give a dispersion of the copper in the polymer solution and a film is cast as in Example III-B. Microscopic examination of the copper powder shows it to consist of particles ranging from $3\mu$ to $100\mu$ in size with the majority of the particles having a diameter of 40 to $50\mu$. The dried film (0.002 inch thick) contains 33% copper and has a resistivity of more than $10^9$ ohms per square.

EXAMPLE V

A clear, yellowish-green solution of 100 grams of the polymer of Example I and 30 grams of anhydrous cupric chloride in 350 ml. of diethylformamide is extruded at 25° C. through a spinneret having 30 orifices of 0.005 inch diameter into perchloroethylene at 25° C. with the speeds of the various advancing rolls being adjusted to draw 4× the coagulated fibers containing 10–35% residual solvent and wound up at 12 yards per minute on a bobbin partially immersed in a tray of a 0.5% solution of sodium borohydride in 50% aqueous dimethylformamide. The drawn yarn is then drawn an additional 1.9× on a 140° C. pin. The dried yarn which has a tenacity of 3.9 grams per denier, an elongation at-the-break of 39%, is electrically conducting. Examination of the yarn shows that 6% metallic copper is present and uniformly distributed throughout in the form of particles less than 0.02 micron in diameter.

The following examples illustrate the preparation of electrically conductive shaped articles containing a finely dispersed metal and having a thin film of metal on their surface.

EXAMPLE VI

A knit tubing is prepared similarly to that of Example III-A and contains 8.3% nickel. It is cut into one-inch squares. Portions of the fabric are treated at 76° C. with a plating bath having the following composition.

| | |
|---|---|
| $NiCl_2 \cdot 6H_2O$ | grams__ 5 |
| Dimethylformamide | ml__ 300 |
| Water | ml__ 200 |
| Dimethylamineborane | grams__ 2 |

After plating, the samples are removed, scrubbed, scoured, dried, and their resistance measured with the results shown in Table I.

Table I

| Fabric Treatment | Resistivity, ohms/square | Nickel Content, percent |
|---|---|---|
| Control fabric (metal-free) | $10^9$ | 0 |
| Reduced fabric, no plating | 67 | 8.3 |
| 2 minutes in plating bath | 19 | 23 |
| 6 minutes in plating bath | 7 | 35 |
| 10 minutes in plating bath | 4.5 | 42 |
| 60 minutes in plating bath | 1.1 | 56 |

Filaments removed from the tubing which is plated for 60 minutes have a breaking strength of 41,000 pounds per square inch.

The 6× drawn yarn of Example III-A (containing 6% nickel reduced in situ) is plated in a similar manner to a final nickel content of 10% and found to have a resistance of 5 to 10 ohms per centimeter of length as well as good tensile properties.

The metallic platings on the fibers of this invention are surprisingly adherent and stable. One possible explanation for this unusual adherence is that some of the dispersed particles protrude through the surface of the fibers and provide anchoring positions for the metallic coatings. For example, portions of a fabric of a tighter construction than above containing 5% nickel reduced in situ and 30% nickel deposited from a plating bath are submitted to 5 laundering cycles. Each cycle consists of a 15-minute, mechanically agitated wash in strong soapy water at 70° C. followed by a 10-minute agitated water rinse. Sometimes the original resistivity of 2 ohms per square is unchanged; in other instances, it has increased to 10-20 ohms per square, but gentle buffing with a cloth reduces this higher value to the original. The fabric contains a total of 29% nickel after the laundering. Appearance of the fabric is not changed by laundering.

The film of Example III-B containing 61.5% nickel that has been cast as the free metal is subjected to the same plating bath. No plating is observable after 30 minutes at 80° C. and the resistance is unchanged from the original value of greater than $10^9$ ohms per square.

EXAMPLE VII

A 7.5 gram portion of a knit tubing produced as in Example III-A containing 7.5% nickel reduced in situ is copper plated by immersing it in a 25° C. solution prepared by dissolving in one liter of water the following ingredients in the given order:

| | Grams |
|---|---|
| Copper sulfate, anhydrous | 19 |
| Sodium potassium tartrate | 100 |
| Sodium hydroxide | 50 |
| 37% formaldehyde | 35 |
| Sodium carbonate, anhydrous | 32 |

Visible plating begins almost immediately. After 5 minutes, the fabric is removed from the bath, washed and dried. The sample has gained 1.45 grams of metallic copper, equivalent to 16% of the final fabric weight and has a resistivity of approximately one ohm per square. Individual filaments removed from the copper-plated fabric have good tenacity and a break elongation of 38%, and a breaking strength of 67,500 pounds per square inch.

The dried fabric resembles copper screening with a dull luster. This can be readily buffed with a cloth to give a shiny, metallic appearance. The plated fabric retains its properties through at least 5 laundering cycles as described in Example VI.

EXAMPLE VIII

A. The film of Example IV-A containing about 11% copper reduced in situ is plated with a nickel-boron alloy using the technique of Example VI for 60 minutes. The resulting film has a silvery-black metallic appearance, and a resistance of about 200 ohms per square.

B. The film of Example IV-B containing 33% of mechanically dispersed copper is given the same plating treatment as above. The copper-like appearance of the film is unaltered as is the resistance, indicating that no plating has taken place.

Fibers are dry spun from the solution of Example IV-A in the manner of Example I. The 4× drawn, 30-filament yarn of 1.5 denier per filament contains 15% $CuCl_2$. The fibers are knitted into tubing and treated in an aqueous-dimethylformamide-solution of sodium borohydride (0.3%) for 5 minutes at 50° C. to reduce the copper salts to copper. After reduction, the dried fabric has a resistance of 20,000 ohms per square. The fabric containing metallic copper is then treated for one hour at 75° C. with the nickel plating bath of Example VI. The washed and dried plated fabric contains 10% of nickel and has a resistance of 200 ohms per square.

EXAMPLE IX

Poly(meta-phenylene isophthalamide) is prepared from meta-phenylene diamine and isophthaloyl chloride according to the method in the co-pending application of Hill et al., Serial No. 642,941, filed February 28, 1957, with an inherent viscosity of 1.74 as measured on a ½% solution in dimethylacetamide.

A solution is made of 44 grams of this polymer in 200 grams of N,N-dimethylacetamide and 10 grams of anhydrous nickel chloride by heating the mixture at 30° C. The solution is extruded at 30° C. into a bath of ethylene glycol at 30° C. through a spinneret with 100 orifices of 0.005 inch in diameter. The coagulated yarn is spun at 5 yards per minute, then drawn 3× on the run and wound up at 15 yards per minute. The yarn is dried and drawn 1.2× on a plate heated at 340° C. A sample of the yarn is then treated in the reducing bath of Example III to reduce the nickel chloride to metallic nickel. The content of metallic nickel in the fiber is 4%. The 200 denier yarn has a tenacity of about 2.5 grams per denier. A sample of the fiber containing the free nickel is knit into tubing and then plated with the nickel-boron alloy according to the method of Example VI. The resulting fabric contains 35% nickel and is electrically conductive.

The above polymer in the amount of 2 grams is dissolved along with 2 grams of lead chloride in 15 ml. of tetramethylene sulfoxide. A film cast from this solution contains 33½% metallic lead and no chloride after reduction in a sodium borohydride solution.

Similar results with lead chloride in dimethylsulfoxide are obtained using the polyurethane (inherent viscosity of 0.9) obtained from bis(4-isocyanato phenyl) methane and ethylene glycol as disclosed in the co-pending application of Lyman, Serial No. 657,716. The film is electrically conducting after plating as in Example VI.

EXAMPLE X

A solution of 10 grams of polyvinyl chloride in 60 ml. of dimethylacetamide, saturated with anhydrous nickel chloride (5-10% estimated), is cast into a film. After drying, the film is reduced with sodium borohydride and then nickel-plated with the plating bath of Example VI to produce an electrically conductive sheet.

EXAMPLE XI

A polythiohydrazide, with an inherent viscosity of 1.07 in dimethylsulfoxide, is made by reacting N,N'-diaminopiperazine and 4,4'-diisothiocyanto diphenyl methane in dimethylsulfoxide at 60° C. A solution of 1.5 grams of this polymer and 2 grams of lead chloride in 10 ml. of dimethylsulfoxide is cast into a film on a glass plate, dried and then soaked in a 0.1% solution of sodium borohydride in 88% aqueous dimethylsulfoxide. The resulting black metallic-looking film containing 30% free lead is non-conducting. Upon plating this film with nickel, cobalt, or copper, the film is rendered electrically conducting.

EXAMPLE XII

A clear viscous solution of 50 grams of the acrylonitrile polymer of Example I and 40 grams of silver nitrate, in 100 ml. of dimethylformamide is cast into a film as in Example III. The film is reduced with a 0.5% aqueous solution of sodium borohydride to give a black, shiny metallic-appearing film with black, metallic silver finely dispersed within the film. The film (0.002 inch thick and containing 21% Ag) has a resistance of more than $2 \times 10^6$ ohms per square. The film is plated as in Example X and then found to have a resistance of less than one ohm per square.

A similar solution of 100 grams of the above polymer and 25 grams of silver nitrate in 350 ml. of dimethylformamide is wet spun into perchloroethylene. The resulting yarn is wound up on a bobbin turning in a solution of sodium borohydride as in Example V. The yarn has an attractive silver-gray appearance but is non-conducting. The silver is present as particles of 0.05 to 0.1 micron in diameter. The larger particle size as compared to that of the other examples may be the reason the fiber is non-conducting. The yarn containing 12% silver reduced in situ is copper plated with the solution of Example VII to give a highly electrically conductive fiber that has the appearance of a dull copper wire.

EXAMPLE XIII

Yarn containing about 30% nickel chloride as made in Example III is used as the fill with a warp of filaments of poly(ethylene terephthalate) of similar denier to make a satin fabric. A sample of the fabric (7.2 grams) weighs 5.5 grams (3.8% nickel by analysis) after being subjected to the reducing procedure of Example III. The fabric is then copper plated, as in Example VII, to a copper content of 33%. The warp fibers are completely free of copper. Because of the construction of the fabric, the surface conductivity depends upon the position of the electrodes. When the electrodes are parallel to the warp (not plated), the surface resistivity is about 0.1 ohm per square. When the electrodes are perpendicular to the warp, the surface resistivity is about 2-300 ohms per square.

Similar results are obtained when the above satin containing 3.8% dispersed free nickel by analysis is nickel plated for 15 minutes as in Example VI.

EXAMPLE XIV

A swatch of fabric made from commercial 66 nylon continuous filaments of 3-denier per filament is soaked in a 10% aqueous solution of acrylic acid for one hour, the fabric wrung out, wrapped in aluminum foil and passed through an electron beam from a Van de Graaff electron accelerator (accelerating potential of 2 million electron volts with a tube current of 250 microamperes) for a total exposure of one "mrep." (millions of Roentgen equivalents physical). The fabric is washed with 80° C. water to remove residual acrylic acid and polyacrylic acid. The fabric contains 7.3% acrylic acid grafted to the nylon. The fabric is soaked in 1% aqueous $Na_2CO_3$ at 80° C. for ten minutes to form sodium acrylate-nylon and rinsed with water. The fabric is then soaked in 1% aqueous $NiCl_2$ at 80° C. for 10 minutes and the residual NaCl and nickel chloride removed from the nickel acrylate-nylon by a water rinsing.

The above fabric is treated as in Example III to reduce the nickel salt to free nickel and thereby yield a jet black fabric containing 3% metallic nickel. A 0.67 gram portion of the reduced fabric is then plated with 0.52 gram of nickel using the technique of Example VI. This fabric has a surface resistivity of less than one ohm per square. The fabric loses only 0.06 gram of weight after 5 laundering cycles, as in Example VI.

Similar results are obtained when the nylon fabric in the above example is replaced with a fabric of either polyacrylonitrile or a fabric of cellulose acetate.

EXAMPLE XV

An elastomeric, non-woven fabric is prepared from fibrids as described in Example I of copending application Serial No. 635,731, filed January 23, 1957. This fabric is grafted with acrylic acid according to the techniques of Example XIV and impregnated with nickel chloride as in Example XIV. The nickel salt is reduced to metallic nickel with sodium borohydride solution to provide a fabric containing 10% metallic nickel. The nickel-containing elastomeric sheet is then nickel plated according to the techniques of Example VI. After 15 minutes in the plating bath, the surface resistance (dry) is approximately 10 ohms per square. This resistance can be reversibly increased to approximately 2000 ohms by stretching the elastomeric sheet to 200 to 300% of its original length.

EXAMPLE XVI

A sample of melt-spun linear polyethylene fiber is converted to a knit fabric. The knit fabric is grafted with acrylic acid according to Examples XIV and XV and metallic nickel in the amount of 3% by weight is deposited in situ by sodium borohydride reduction of the nickel salt. Treatment of the nickel-containing polyethylene fabric with a nickel plating bath gives a fabric containing 13% total nickel and a resistivity of less than 0.1 ohm per square.

EXAMPLE XVII

A solution of 40 g. of copolymer of Example I and 15 g. of silver nitrate in 400 cc. of DMF is poured in a fine stream into a Waring Blendor containing 4 g. of sodium borohydride in 500 ml. of isopropanol with vigorous stirring. The black "fibrid" product is mixed with an equal weight of ¼" staple yarn made from the same copolymer in an aqueous suspension, and a waterleaf is prepared on conventional papermaking equipment. The waterleaf is pressed at 150° at 2000 p.s.i. to give a tough, black paper. This paper is readily plated in the nickel plating bath described in Example VI to give a tough, silvery sheet containing 19% total nickel and a restivity of less than 1 ohm per square.

EXAMPLE XVIII

Yarn containing metallic copper prepared according to Example V is cut into ¼" staple and is plated in the copper plated bath of Example VII for 15 minutes. This copper plated staple has the appearance of fine copper wire and by analysis is 33% copper. A "fibrid" binding material is prepared by pouring in a thin stream a solution of 40 g. of a copolymer of styrene and acrylonitrile (70/30) and 15 g. of copper chloride in 400 ml. of DMF into a vigorously agitated 1% solution of sodium borohydride in isopropanol. A mixture of 50 parts of the washed binder, 33 parts of wood pulp, and 17 parts of the copper plated fibers is made into a waterleaf and pressed at 135° to a tough sheet of paper. This paper, in which the copper plated fibers are uniformly dispersed, is highly conducting having a restivity of approximately 0.5 ohm per square. This paper is easily nickel plated with the solution of Example VI to a silvery-gray paper with a restivity of 0.2 ohm per square. By the process of this invention electrically conducting fibrous sheets of any desired thickness or size can be produced.

EXAMPLE XIX

A solution of 40 g. of a copolymer of styrene and acrylonitrile (70/30) and 15 g. of silver nitrate in DMF is poured in a thin stream into a 1% solution of sodium borohydride in isopropanol which is vigorously agitated in a Waring Blendor. The fibrous, black product containing dispersed free silver therein is mixed with an equal weight of ¼" polyacrylonitrile staple and a waterleaf is prepared in the usual manner. This waterleaf is converted to a sheet of tough, black paper by pressing at 150° for one minute at 2000 p.s.i. It is non-conducting. A similar waterleaf is dipped into the nickel plating bath of Example VI and allowed to plate for 5 minutes at 75°. The nickel plated waterleaf is then dried and pressed as above to a tough, silvery-gray sheet containing 23% metal with a resistivity of approximately 1 ohm per square.

EXAMPLE XX

A fibrous binding material of the class designated as fibrids in copending application Serial No. 635,876, filed January 23, 1957, is prepared by pouring a solution of a copolymer of hexamethylene adipamide and caprolactam (20/80) in hot ethylene glycol in a thin stream into a vigorously stirred quenching bath consisting of cold ethylene glycol. This fibrous binder is mixed with an equal weight of copper plated staple fiber as in Example VII. A slurry of this mixture is cast to a waterleaf on papermaking machinery and the resulting product is pressed at 135° to give a tough sheet of paper. It shows a restivity of approximately 0.1 ohm per square and has the appearance of a speckled coppery sheet. Alternatively, the waterleaf may be nickel plated in the bath of Example VI. The resulting product is pressed at 135° C. to a silvery-black sheet with a restivity of 0.10 ohm per square.

EXAMPLE XXI

A waterleaf is prepared from 50% wood pulp and 50% of the fibrous binding material described in Example XIX (metallic silver dispersed in a copolymer of styrene and acrylonitrile). The waterleaf is pressed at 150° to a brownish tough sheet of paper which is non-conducting. Alternatively, the waterleaf is plated for 5 minutes in a nickel plate bath and then pressed. The silvery-gray sheet has a restivity of 10 ohms per square. Instead of the nickel plating bath, the copper plating bath of Example VII may be used. Plating of the waterleaf in this bath for 15 minutes gives after pressing a sheet of tough paper with a coppery surface and a restivity of about 0.5 ohm per square.

EXAMPLE XXII

One square foot of cotton broadcloth shirting fabric is soaked for one hour in a concentrated aqueous solution of nickel chloride. The fabric is removed, blotted free of surface liquid, and then dipped for 30 seconds in a 2% solution of sodium borohydride in water. The intense black colored fabric is washed with soap and water to remove extraneous material. The black fabric, which is non-conducting, is then plated for 5 minutes in the nickel plating bath of Example VI. The resulting product is a silver-gray fabric with a conductivity of approximately 7 ohms per square. Similar results are obtained by soaking various cellulosic papers in nickel chloride and treating them as for the cotton fabric.

EXAMPLE XXIII

A sheet of wood pulp is beaten vigorously in a Waring Blendor with a 20% aqueous nickel chloride solution. After 15 minutes, the mixture is filtered by suction as dry as possible. The mass of pulp (about 20 g.) is added to a solution of 2 g. of sodium borohydride in 250 cc. of water which is agitated vigorously in a Waring Blendor. After 5 minutes, the black product is filtered on a wire screen and washed repeatedly with water. Approximately half of the damp product is added to the nickel plate bath of Example VI for 5 minutes. The other half is added to the copper plate bath of Example VII for 15 minutes.

The copper plated wood pulp is made into a waterleaf with 25% of a fibrous product obtained by precipitating a solution of a copolymer of vinyl chloride and vinyl acetate (87/13) from DMF into vigorously stirred water in a Waring Blendor. The waterleaf is pressed at 150° C. and 2000 p.s.i. to a sheet of tough, reddish-brown paper. This paper is highly conducting, having a resistivity of aproximately 1 to 2 ohms per square. By analysis, it is 37% of a mixture of copper and nickel.

The nickel plated wood pulp is made into a sheet of paper by preparing a waterleaf with 50% by weight of the fibrous binder described above. A tough, black sheet is obtained after pressing at 150° C. It contains by analysis 20% of nickel and has a resistance of approximately 400 ohms per square. A four inch piece of this paper is folded and a thermometer is inserted into the fold. Various electrical potentials are applied across the ends of the paper and the heating effect is measured by the thermometer.

| Voltage: | Temperature, degrees |
|---|---|
| 29 volts | 44 |
| 35 volts | 54 |
| 45 volts | 78 |
| 55 volts | 98 |

Electrically conductive papers or woven or knitted fabrics can be used as follows: radiant heating structures such as wall covers, auto seat covers, auto ceiling liners, electric blankets, electric clothing for hunters, aviators, etc.; shielding for electronic equipment, wave guides (single filaments), decorative radio antenna, electrodes for electrolytic condensers, as substitutes for copper wire where great flexibility is required as, for example, on telephone sets, etc.

Other products of this invention can be used to fabricate reflectors for light, radio or radar use or as packing for distillation columns. Shaped articles that may not necesarily be electrically conducting, containing a metal reduced in situ, can be used as catalyst carriers, especially with metals as platinum, palladium, copper, or nickel, as substitutes for fine wire gauze, as magnetic shielding, or in magnetic recording devices.

The claimed invention:

1. An electrically conducting shaped article comprising a linear synthetic organic hydrophobic polymeric material containing dispersed therein finely divided particles of a metal which is more electronegative than chromium in the electromotive force series, said particles having an average diameter of less than about one micron and being present in an amount between about 0.1% and about 35% based upon the total weight of the article; said article containing up to about 60% by weight inclusive of a thin adherent coating comprising a metal and having a surface resistivity of less than 50,000 ohms.

2. An electrically conducting shaped flexible article comprising a linear synthetic organic hydrophobic thermoplastic polymer containing dispersed therein finely divided particles of a metal, having an atomic number of from 26 to 29, inclusive, in the free metal state, said particles having an average diameter of less than about one micron and being present in an amount between about 4% and about 35% based upon the total weight of the article, said article having a surface resistivity of less than about 50,000 ohms.

3. The article of claim 2 in which the metal is nickel.
4. The article of claim 2 in which the metal is cobalt.
5. The article of claim 2 in which the metal is copper.
6. The article of claim 2 in which the metal is iron.
7. The article of claim 2 in the form of a fibrous structure.
8. The article of claim 2 in the form of a paper.
9. The article of claim 2 in the form of a film.
10. The article of claim 2 in the form of a filament.
11. An electrically conducting shaped article comprising a linear synthetic organic hydrophobic film-forming polymer containing dispersed therein finely divided particles of a heavy metal more electronegative than chromium in the electromotive force series, said particle having an average diameter of less than about one micron and being present in an amount from about 0.1% to about 35% based upon the total weight of the article and having a thin adherent coating comprising a metal, said coating amounting to between about 1% and about 60% by weight of the total weight of the article, said article having a surface resistivity of less than about 50,000 ohms.
12. The article of claim 11 in which the coating comprises nickel.
13. The article of claim 11 in which the coating comprises cobalt.
14. The article of claim 11 in which the coating comprises copper.
15. The article of claim 11 in which the coating comprises a metal more electronegative than manganese in the E.M.F. series.

16. A process comprising admixing a linear synthetic organic hydrophobic polymeric material with a salt of a metal having an atomic number from 26 to 29, inclusive, forming the mixture into a shaped article, treating the article to reduce the metal salt to free metal particles having an average diameter of less than about one micron, said particles being present in an amount from about 4% to about 35% by weight.

17. The process of claim 16 in which the shaped article is a fibrous sheet.

18. The process of claim 16 in which the shaped article is a filament.

19. The process of claim 16 in which the shaped article is a film.

20. The process comprising admixing a linear synthetic organic hydropholic polymeric material with a salt of a metal having an atomic number from 26 to 29, inclusive, precipitating the polymer under conditions of high shear and forming the precipitated fibrous particles containing the dispersed metal salt into a shaped article, treating the article to reduce the metal salt to free metal particles having an average diameter of less than about one micron, said particles being present in an amount from about 4% to about 35% by weight.

21. A process comprising admixing a linear synthetic organic hydrophobic polymeric material with a salt of a metal more electronegative than chromium in the E.M.F. series, forming the mixture into a shaped article, treating the article to reduce the metal salt to free metal particles having an average diameter of less than about one micron, said particles being present in an amount from about 0.1% to about 35% by weight, and coating the thus treated article with a metal.

22. The process of claim 21 in which the shaped article is a fibrous sheet.

23. The process of claim 21 in which the shaped article is a film.

24. The process of claim 21 in which the shaped article is a filament.

25. The process comprising admixing a linear synthetic organic hydrophobic polymeric material with a salt of a metal more electronegative than chromium in the E.M.F. series, precipitating the polymer under conditions of high shear and forming the precipitated fibrous particles containing the dispersed metal salt into a shaped article, treating the article to reduce the metal salt to free metal particles having an average diameter of less than about one micron, said particles being present in an amount from about 4% to about 35% by weight, and coating the resulting article with a metal, said metal being present in the range of from 5–10% by weight of said article.

26. The process of claim 25 wherein the polymeric material comprises a linear fiber-forming polymer.

References Cited in the file of this patent

UNITED STATES PATENTS

| | | |
|---|---|---|
| 2,690,401 | Gutzeit et al. | Sept. 28, 1954 |
| 2,690,402 | Crehen et al. | Sept. 28, 1954 |
| 2,864,774 | Robinson | Dec. 16, 1958 |
| 2,877,138 | Vodonik | Mar. 10, 1959 |
| 2,930,106 | Wrotnowski | Mar. 29, 1960 |